United States Patent
Zhang

(10) Patent No.: US 10,560,475 B2
(45) Date of Patent: *Feb. 11, 2020

(54) PROCESSOR FOR ENHANCING NETWORK SECURITY

(71) Applicant: ChengDu HaiCun IP Technology LLC, ChengDu (CN)

(72) Inventor: Guobiao Zhang, Corvallis, OR (US)

(73) Assignees: ChengDu HaiCun IP Technology LLC, ChengDu, SiChuan (CN); Guobiao Zhang, Corvallis, OR (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/729,640

(22) Filed: Oct. 10, 2017

(65) Prior Publication Data

US 2018/0034831 A1 Feb. 1, 2018

Related U.S. Application Data

(63) Continuation-in-part of application No. 15/452,728, filed on Mar. 7, 2017.

(30) Foreign Application Priority Data

| Mar. 7, 2016 | (CN) | 2016 1 0127981 |
| Mar. 3, 2017 | (CN) | 2017 1 0122861 |
| Mar. 7, 2017 | (CN) | 2017 1 0130887 |
| Jun. 17, 2017 | (CN) | 2017 1 0459978 |
| Jun. 19, 2017 | (CN) | 2017 1 0461239 |
| Sep. 21, 2017 | (CN) | 2017 1 0856318 |

(51) Int. Cl.
*H04L 29/06* (2006.01)
*H01L 27/105* (2006.01)

(52) U.S. Cl.
CPC .......... *H04L 63/145* (2013.01); *H01L 27/105* (2013.01)

(58) Field of Classification Search
CPC ..................................................... H04L 63/145
See application file for complete search history.

(56) References Cited

U.S. PATENT DOCUMENTS

| 5,440,749 A | 8/1995 | Moore et al. |
| 5,835,396 A | 11/1998 | Zhang |
| 6,034,882 A | 3/2000 | Johnson et al. |
| 6,351,406 B1 | 2/2002 | Johnson et al. |

(Continued)

OTHER PUBLICATIONS

Paul et al., "An Efficient and Scalable Semiconductor Architecture for Parallel Automata Processing", IEEE Transactions on Parallel and Distributed Systems, vol. 25, No. 12, pp. 3088-3098, 2014.

(Continued)

*Primary Examiner* — Kambiz Zand
*Assistant Examiner* — Thanh H Le

(57) ABSTRACT

The present invention discloses a processor for enhancing network security, i.e. a three-dimensional (3-D) security processor. It is a monolithic integrated circuit comprising a plurality of storage-processing units (SPU). Each SPU comprises at least a three-dimensional memory (3D-M) array for permanently storing rule/virus patterns and a pattern-processing circuit for performing pattern processing on an incoming network packet against said rule/virus patterns. The 3D-M array is stacked above the pattern-processing circuit.

20 Claims, 7 Drawing Sheets

(56) References Cited

U.S. PATENT DOCUMENTS

| | | |
|---|---|---|
| 6,717,222 B2 | 4/2004 | Zhang |
| 6,861,715 B2 | 3/2005 | Zhang |
| 7,158,220 B2 | 1/2007 | Zhang |
| 7,188,369 B2 | 3/2007 | Ho et al. |
| 7,468,667 B2 | 12/2008 | Moffett |
| 7,523,500 B1 | 4/2009 | Szor et al. |
| 7,716,051 B2 | 5/2010 | Dow et al. |
| 7,831,606 B2 | 11/2010 | Pandya |
| 7,839,854 B2 | 11/2010 | Alexander |
| 7,853,689 B2 | 12/2010 | Enderby |
| 7,854,008 B1 | 12/2010 | Huang et al. |
| 8,281,395 B2 | 10/2012 | Powlowski |
| 8,327,446 B2 | 12/2012 | Liang et al. |
| 8,365,287 B2 | 1/2013 | Yoo |
| 8,392,989 B2 | 3/2013 | Upadhyay |
| 8,640,237 B2 | 1/2014 | Haeffele et al. |
| 8,726,362 B2 | 5/2014 | Yoo |
| 8,973,130 B2 | 3/2015 | Yoo |
| 9,064,114 B2 | 6/2015 | Hamid |
| 9,196,247 B2 | 11/2015 | Harada |
| 9,407,648 B1 | 8/2016 | Pavlyushchik et al. |
| 9,436,824 B1 | 9/2016 | Levchenko et al. |
| 2004/0012053 A1* | 1/2004 | Zhang ............... H01L 27/0688 257/390 |
| 2006/0242710 A1 | 10/2006 | Alexander |
| 2008/0140662 A1* | 6/2008 | Pandya ............... G11C 15/00 |
| 2009/0044273 A1 | 2/2009 | Zhou et al. |
| 2017/0061304 A1* | 3/2017 | Van Lunteren ....... G06F 9/4498 |

OTHER PUBLICATIONS

Paul et al, "MAHA: An Energy-Efficient Malleable Hardware Accelerator for Data-Intensive Applications", Very Large Scale Integration (VLSI) Systems, IEEE Transactions on, vol. 23, No. 6, pp. 1005-1016, 2015.

Karam et al, "Emerging Trends in Design and Applications of Memory-Based Computing and Content-Addressable Memories", Proceedings of the IEEE, vol. 103, issue 8, pp. 1311-1330, 2015.

* cited by examiner

PROCESSOR FOR ENHANCING NETWORK SECURITY

CROSS-REFERENCE TO RELATED APPLICATIONS

This application is a continuation-in-part of application "Distributed Pattern Processor Comprising Three-Dimensional Memory", application Ser. No. 15/452,728, filed Mar. 7, 2017, which claims priorities from Chinese Patent Application No. 201610127981.5, filed Mar. 7, 2016; Chinese Patent Application No. 201710122861.0, filed Mar. 3, 2017; Chinese Patent Application No. 201710130887.X, filed Mar. 7, 2017, in the State Intellectual Property Office of the People's Republic of China (CN).

This application also claims priorities from Chinese Patent Application No. 201710459978.8, filed Jun. 17, 2017; Chinese Patent Application No. 201710461239.2, filed Jun. 19, 2017; Chinese Patent Application No. 201710856318.3, filed Sep. 21, 2017, in the State Intellectual Property Office of the People's Republic of China (CN), the disclosures of which are incorporated herein by references in their entireties.

BACKGROUND

1. Technical Field of the Invention

The present invention relates to the field of integrated circuit, and more particularly to a processor for enhancing network security.

2. Prior Art

With the proliferation of the Internet, network security becomes great concerns. Network security does as its title explains: it secures the network, as well as protecting and overseeing operations being done. Network security can be generally categorized into rule enforcement and anti-malware, although there is considerable overlap between the two.

Rules (also known as network rules, security rules, etc.) include policies and practices adopted to prevent and monitor unauthorized access, misuse, modification, or denial of a computer network and network-accessible resources. During rule enforcement, a network packet is compared against rule patterns in a rule database (also known as rule pattern database, etc.).

Malware, short for malicious software, is any software used to disrupt computer operation, gather sensitive information, or gain access to private computer systems. During the anti-malware operation, a network packet is compared against malware patterns in a malware database. Unless explicitly stated, the present invention does not differentiate "malware" and "virus". They are used interchangeably.

The basic operations in rule enforcement and anti-malware are pattern matching and/or pattern recognition. Pattern matching and pattern recognition are the acts of searching a target pattern (i.e. the pattern to be searched) for the presence of the constituents or variants of a search pattern (i.e. the pattern used for searching). The match usually has to be "exact" for pattern matching, while it could be "likely to a certain degree" for pattern recognition. In the case of network security, the target pattern is a network packet, whereas the search pattern is a rule/virus pattern. Unless explicitly stated, the present invention does not differentiate pattern matching and pattern recognition. They are collectively referred to as pattern processing. In addition, search patterns and target patterns are collectively referred to as patterns.

Both rule database and virus database have become large: the number of network rules has reached tens of thousands, soon to hundreds of thousands; whereas, the number of computer viruses has reached hundreds of thousands, soon to millions. Pattern processing for such large rule/virus database requires not only a powerful processor, but also a fast storage. Unfortunately, a conventional network-security system cannot meet these requirements. Because it has a limited number (tens to hundreds) of cores, a typical processor (CPU, GPU, etc.) can simultaneously perform only a limited number (tens to hundreds) of pattern processing. Furthermore, because the processor is separated from the storage in a von Neumann architecture, the "memory wall" between them would cause a long delay when the processor fetches rule/virus patterns from the storage. As a result, the performance of the conventional network-security system is poor.

Objects and Advantages

It is a principle object of the present invention to enhance network security.

It is a further object of the present invention to improve the efficiency of rule enforcement for network security.

It is a further object of the present invention to improve the anti-malware efficiency for network security.

It is a further object of the present invention to enhance network security at a reasonable cost.

In accordance with these and other objects of the present invention, the present invention discloses a processor for enhancing network security.

SUMMARY OF THE INVENTION

The present invention discloses a processor for enhancing network security. It is a part of a computer network. In a computer network, networked computing devices exchange data with each other using a data link, which is established using either cable media or wireless media. The preferred processor performs pattern processing on an incoming network packet against rule/virus patterns in a rule/virus database. Different from prior art, the storage of the rule/virus database is permanent, in situ and uses a three-dimensional (3-D) integration.

The preferred processor is a monolithic integrated circuit comprising a plurality of storage-processing units (SPU). Each SPU comprises a pattern-processing circuit and at least a three-dimensional memory (3D-M) array. The 3D-M array permanently stores rule/virus patterns, while the pattern-processing circuit performs pattern processing on an incoming network packet against said rule/virus patterns. The 3D-M array is stacked above the pattern-processing circuit and is communicatively coupled with the pattern-processing circuit through a plurality of contact vias. This type of vertical integration is generally referred to as 3-D integration; and, the contact vias are collectively referred to as inter-storage-processor (ISP) connection. Since the 3-D integration is used, the preferred processor of the present invention is referred to as 3-D security processor.

The permanent and in-situ nature of the storage inside the preferred 3-D security processor improves the network-security performance. Stored permanently and in situ, the rule/virus patterns do not have to be transferred from an external storage (e.g. hard-disk drive, solid-state drive) to the processor for pattern processing. By avoiding the "memory wall" faced by the von Neumann architecture, the preferred 3-D security processor can achieve a significant performance improvement.

The 3-D integration of the memory circuit (i.e. 3D-M arrays) and the processing circuit (i.e. pattern-processing circuits) offers many benefits. Although there is a growing trend to integrate more memory into a processor, the type of horizontal integration used by prior art is a two-dimensional (2-D) integration. To be more specific, the processing circuit and the memory circuit are formed side-by-side on the surface of a semiconductor substrate. Using the 2-D integration, the footprint of a conventional processor is the sum of those of the memory circuit and the processing circuit.

In contrast, the preferred 3-D security processor uses a 3-D integration. Because the 3D-M array is stacked above the pattern-processing circuit and does not occupy any substrate area, the footprint of the SPU is the larger of those of the 3D-M array and the pattern-processing circuit. Accordingly, in a given die area, a preferred 3-D security processor has more storage capacity and more processing power than prior art. More storage capacity means fewer dice to store the whole rule/virus database and therefore, a lower overall cost; and, more processing power means more pattern-processing circuits on each die and therefore, more parallelism. In addition, the 3-D integration makes the connections (i.e. the contact vias) between the memory circuits (i.e. the 3D-M arrays) and the processing circuits (i.e. the pattern-processing circuits) short (on the order of a micron in length, much shorter than prior art) and numerous (thousands in number, much more than prior art). As a result, the ISP-connection in the preferred 3-D security processor has a larger bandwidth.

Accordingly, the present invention discloses a processor for enhancing network security, comprising: an input for transferring at least a network packet; a semiconductor substrate having transistors thereon; a plurality of storage-processing units (SPU), each of said SPUs comprising a pattern-processing circuit and at least a three-dimensional memory (3D-M) array, wherein said 3D-M array is stacked above said pattern-processing circuit and stores at least a rule/virus pattern; said pattern-processing circuit is formed on said semiconductor substrate and performs pattern matching or pattern processing on said network packet against said rule/virus pattern; said 3D-M array and said pattern-processing circuit are communicatively coupled by a plurality of contact vias.

As used herein, the phrase "permanent" is used in its broadest sense to mean any long-term storage; the phrase "communicatively coupled" is used in its broadest sense to mean any coupling whereby information may be passed from one element to another element; the symbol "/" means "and/or". For example, "rule/virus" could mean "rule" only, "virus" only, or "rule" and "virus" both.

Figure 1:
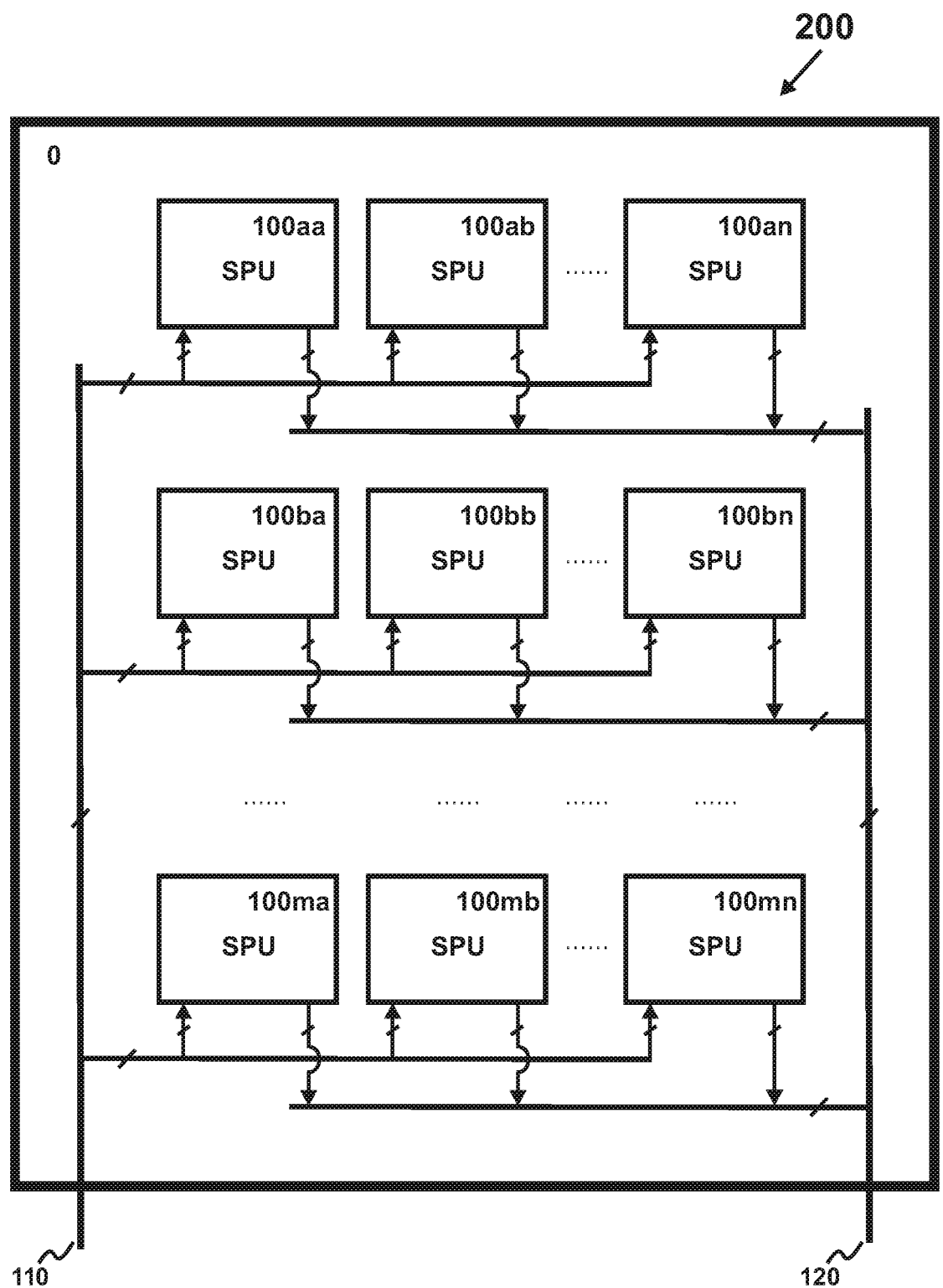
FIG. 1 is a circuit block diagram of a preferred 3-D security processor.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Referring now to FIG. 1, a preferred processor 200 for enhancing network security, i.e. a three-dimensional (3-D) security processor, is disclosed. The preferred 3-D security processor 200 not only performs pattern processing, but also permanently stores a rule/virus database. It comprises m×n storage-processing units (SPU) 100$aa$-100$mn$. Each SPU is commutatively coupled with an input 110 and an output 120. The input 110 includes at least a network packet, while the output 120 includes at least a result of the pattern processing. Storing rule/virus patterns permanently and in situ, the preferred 3-D security processor 200 avoids the "memory-wall" faced by the von Neumann architecture. In addition, because the preferred 3-D security processor 200 comprises thousands, even tens of thousands, of SPUs 100$aa$-100$mn$, massive parallelism can be achieved.

The preferred 3-D security processor 200 is a part of a computer network. In a computer network, networked computing devices exchange data with each other using a data link, which is established using either cable media or wireless media. The preferred 3-D security processor 200 may be embodied as independent integrated circuits working with or may also be embodied within central processing units (CPU), microprocessors, multi-core processors, graphic processing units (GPU), network processors, TCP offload engines, network packet classification engines, protocol processors, regular expression processors, content search processors, network search engines, content addressable memories, mainframe computers, grid computers, servers, workstations, personal computers, laptops, notebook computers, PDAs, handheld devices, cellular phones, wired or wireless networked devices, switches, routers, gateways, unified threat management devices, firewalls, VPNs, intrusion detection and prevention systems, extrusion detection systems, compliance management systems, wearable computers, medical devices, Internet of things (IoT) devices, data warehouses, storage area network devices, storage systems, data vaults, chipsets and the like, or their derivatives or any combination thereof.

The rule database (also known as rule pattern database and the like), includes network layer rules for monitoring contents from a network layer, storage-area networking rules for monitoring contents in a storage area network, application layer rules for monitoring contents from an application layer, or the like or a combination thereof. The network layer rules further include access control rules, network address rules, port specific rules, protocol specific rules, or the like or a combination thereof. The storage-area networking rules further include logical unit number (LUN) masking rules, zoning rules, frame filtering rules, logical block addressing rules, or the like or a combination thereof. The application layer rules further include intrusion detection rules, extrusion detection rules, digital rights management rules, anti-phishing rules, legal compliance detection rules, instant message inspection rules, XML security rules, VOIP rules, or the like or a combination thereof.

The virus database (also known as virus pattern database, virus signature database, malware database, malware pattern database, malware signature database, signature database, etc.) includes patterns of malwares, computer viruses, computer worms, spam, spywares, ransomeware, sharewares, spyware, trojan horses, keyloggers, backdoors, rootkits, dialers, fraudtools, adware, browser hijackers, browser helper objects (BHOs), or the like, or any future derivatives or a combination thereof.

Figure 2A:
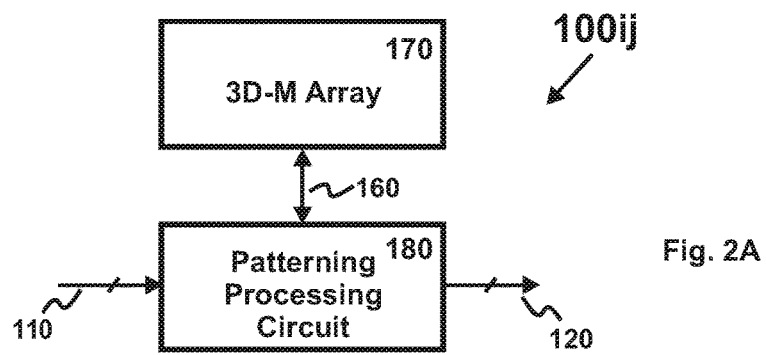
FIGS. 2A-2C are circuit block diagrams of three preferred storage-processing units (SPU)
Figure 2B:
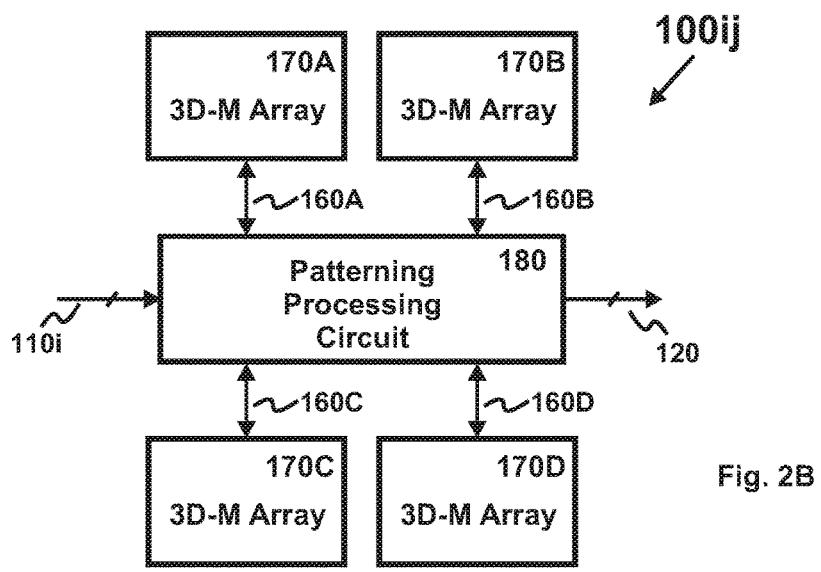
Figure 2C:
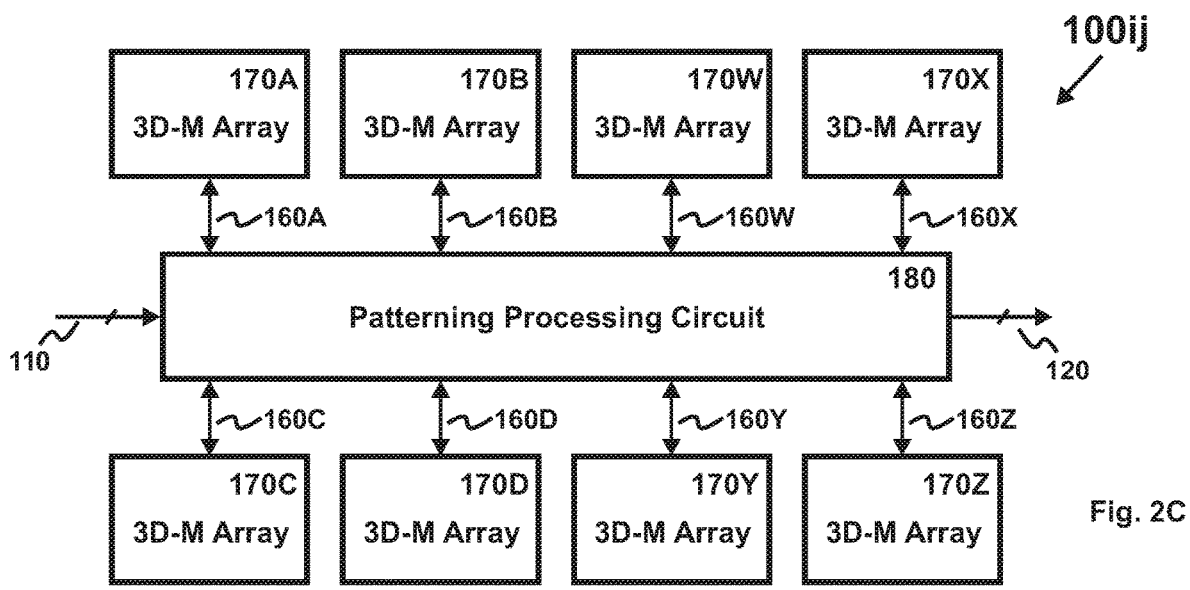

FIGS. 2A-2C discloses three preferred SPUs 100$ij$. Each SPU 100$ji$ comprises a pattern-processing circuit 180 and at least a 3D-M array 170 (or, 170A-170D, 170W-170Z), which are communicatively coupled through an inter-storage-processor (ISP) connection 160 (or, 160A-160D, 160W-160Z). The 3D-M array 170 stores at least a virus pattern, which is compared with the network packet from the input 110 during the pattern processing. In these embodiments, the pattern-processing circuit 180 works with different number of 3D-M arrays. In the first embodiment of FIG. 2A, the pattern-processing circuit 180 works with one 3D-M array 170. In the second embodiment of FIG. 2B, the pattern-processing circuit 180 works with four 3D-M arrays 170A-170D. In the third embodiment of FIG. 2C, the pattern-processing circuit 180 works with eight 3D-M array 170A-170D, 170W-170Z. As will become apparent in FIGS. 5A-5C, the more 3D-M arrays it comprises, a larger footprint and therefore more functions will the SPU 100$ij$ have.

The pattern-processing circuit 180 performs pattern matching and/or pattern recognition. It may take many forms. In one example, since a portion of the rules (or, the virus signatures) can be represented by a string of characters, the pattern-processing circuit 180 may comprise a text-matching circuit or a code-matching circuit. The text/code-matching circuits could be implemented by a content-addressable memory (CAM) or a comparator including XOR circuits. In another example, since another portion of the rules (or, the virus signatures) can be represented by a regular expression, the pattern-processing circuit 180 can be implemented by finite-state automata (FSA) circuits, which could be non-deterministic FSA (NFA) circuits or deterministic FSA (DFA) circuits.

Figure 3A:
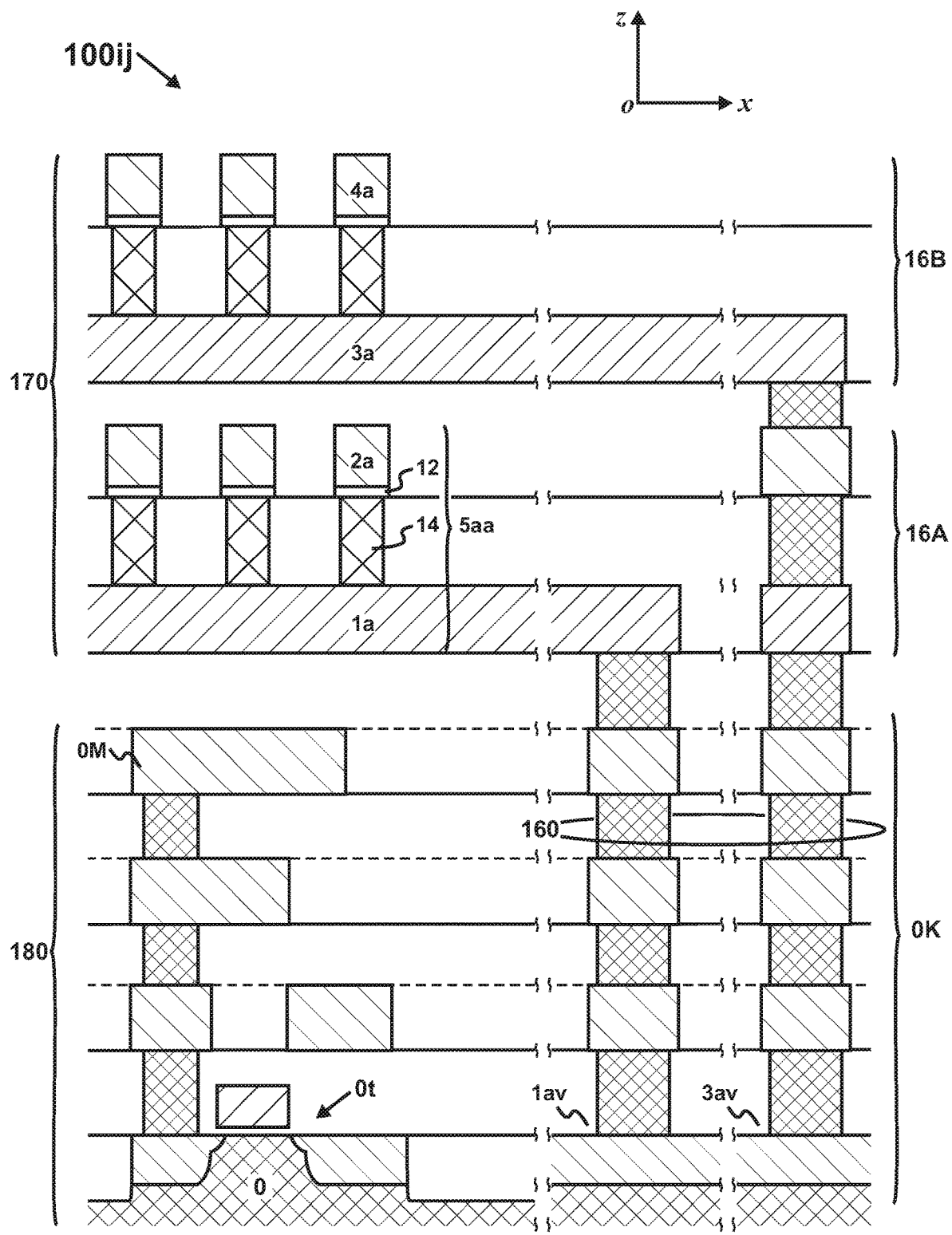
FIG. 3A is a cross-sectional view of a preferred SPU comprising at least a three-dimensional writable memory (3D-W) array.
Figure 3B:
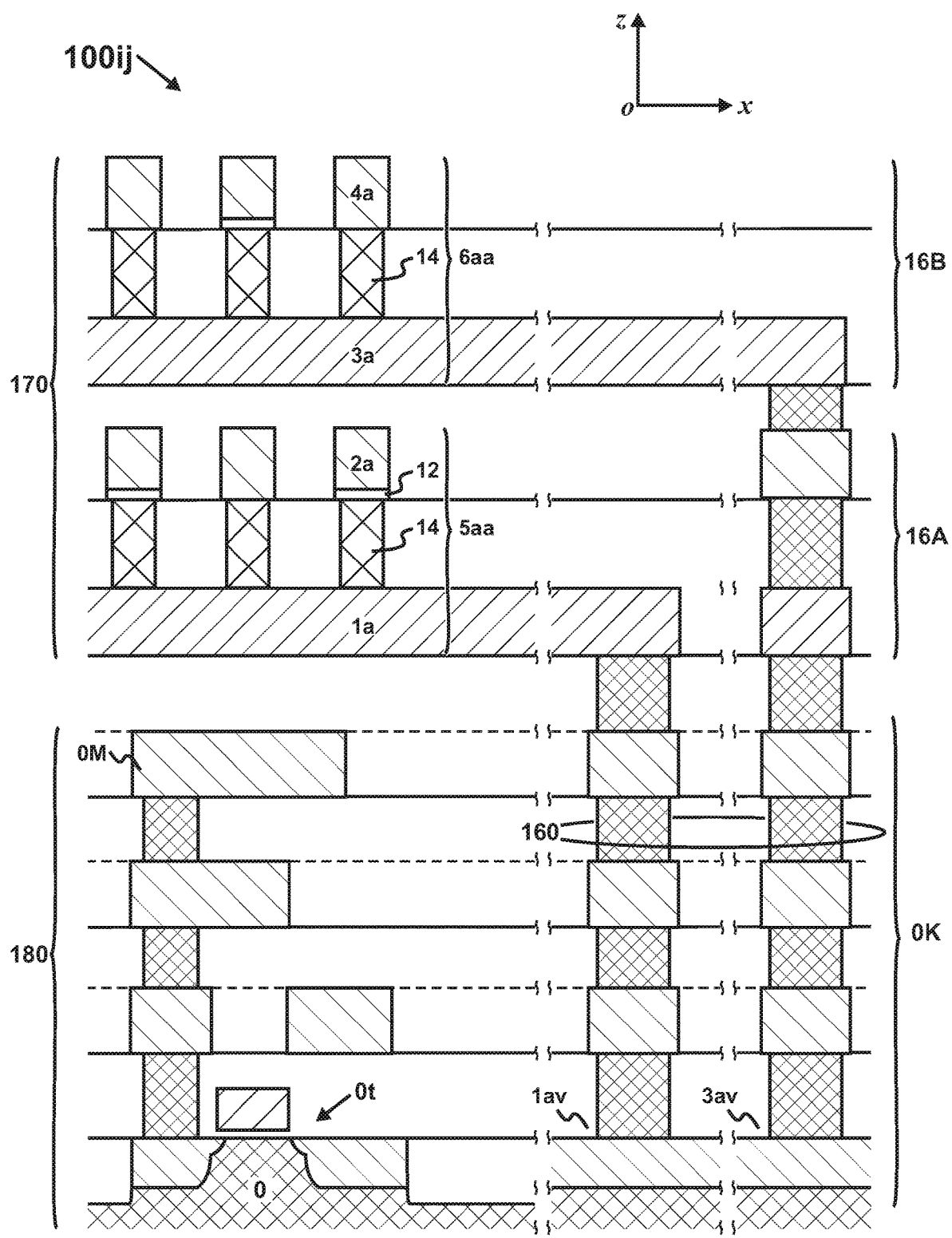
FIG. 3B is a cross-sectional view of a preferred SPU comprising at least a three-dimensional printed memory (3D-P) array.

Referring now to FIGS. 3A-3B, two preferred SPUs 100$ij$ comprising at least a 3D-M array is shown. The 3D-M is a monolithic semiconductor memory comprising a plurality of memory cells stacked above and coupled to a semiconductor substrate. A 3D-M array is a collection of 3D-M cells sharing at least one address line. The most common 3D-M is three-dimensional read-only memory (3D-ROM), which permanently stores information.

Based on the orientation of the memory cells, the 3D-M can be categorized into three-dimensional horizontal memory (3D-M$_H$) and three-dimensional vertical memory (3D-M$_V$). In a 3D-M$_H$, the memory cells form horizontal memory level(s) which are stacked above a semiconductor substrate. One well-known 3D-M$_H$ is 3D-XPoint. In a 3D-MV, the memory cells form a plurality of vertical memory strings which are placed side-by-side on a semiconductor substrate. One well-known 3D-M$_V$ is 3D-NAND. The 3D-XPoint is faster, while the 3D-NAND is denser.

The 3D-M of FIG. 3A is a three-dimensional writable memory (3D-W). The 3D-W cells are electrically programmable. Based on the number of programming allowed, a 3D-W can be further categorized into three-dimensional one-time-programmable memory (3D-OTP) and three-dimensional multiple-time-programmable memory (3D-MTP, including 3-D re-programmable memory). Types of the 3D-MTP cells include flash-memory cells, memristor, resistive random-access memory (RRAM or ReRAM) cell, phase-change memory (PCM) cell, programmable metallization cell (PMC), conductive-bridging random-access memory (CBRAM) cell, and the like. The 3D-OTP, generally based on antifuse programming, can be used to store a virus database, because the virus patterns are only added but not modified.

The 3D-W comprises a substrate circuit 0K formed on the substrate 0. A first memory level 16A is stacked above the substrate circuit 0K, with a second memory level 16B stacked above the first memory level 16A. The substrate circuit 0K includes the peripheral circuits of the memory levels 16A, 16B. It comprises transistors 0$t$ and the associated interconnect 0M. Each of the memory levels (e.g. 16A, 16B) comprises a plurality of first address-lines (i.e. y-lines, e.g. 2$a$, 4$a$), a plurality of second address-lines (i.e. x-lines, e.g. 1$a$, 3$a$) and a plurality of 3D-W cells (e.g. 5$aa$). The first and second memory levels 16A, 16B are coupled to the substrate circuit 0K through contact vias 1$av$, 3$av$, respectively. Because they couple the 3D-M array 170 and the pattern-processing circuit 180, the contacts vias 1$av$, 3$av$ are collectively referred to as inter-storage-processor (ISP) connection 160.

In this preferred embodiment, a 3D-W cell 5$aa$ comprises a programmable layer 12 and a diode layer 14. The programmable layer 12 could be an OTP layer (e.g. an antifuse layer, used for 3D-OTP) or an MTP layer (e.g. a phase-change layer, used for 3D-MTP). The diode layer 14 is broadly interpreted as any layer whose resistance at the read voltage is substantially lower than when the applied voltage has a magnitude smaller than or polarity opposite to that of the read voltage. The diode could be a semiconductor diode (e.g. p-i-n silicon diode), or a metal-oxide (e.g. TiO$_2$) diode.

The 3D-M of FIG. 3B is a three-dimensional printed memory (3D-P). The 3D-P is a type of 3D-M whose data are recorded using a printing method during the manufacturing process. These data are fixedly recorded and cannot be changed after manufacturing. The printing methods include photo-lithography, nano-imprint, e-beam lithography, DUV lithography, and laser-programming, etc. A common 3D-P is three-dimensional mask-programmed read-only memory (3D-MPROM), whose data are recorded by photo-lithography. Because electrical programming is not needed, a 3D-P cell can be biased at a larger voltage/current during read than a 3D-W cell and therefore, is faster.

The 3D-P has at least two types of 3D-P cells: a high-resistance 3D-P cell 5$aa$, and a low-resistance 3D-P cell 6$aa$. The low-resistance 3D-P cell 6$aa$ comprises a diode layer 14, while the high-resistance 3D-P cell 5$aa$ comprises a high-resistance layer 12. As an example, the high-resistance layer 12 is a layer of silicon oxide (SiO$_2$). This high-resistance layer 12 is physically removed at the location of the 3D-P cell 6$aa$.

Figure 4:
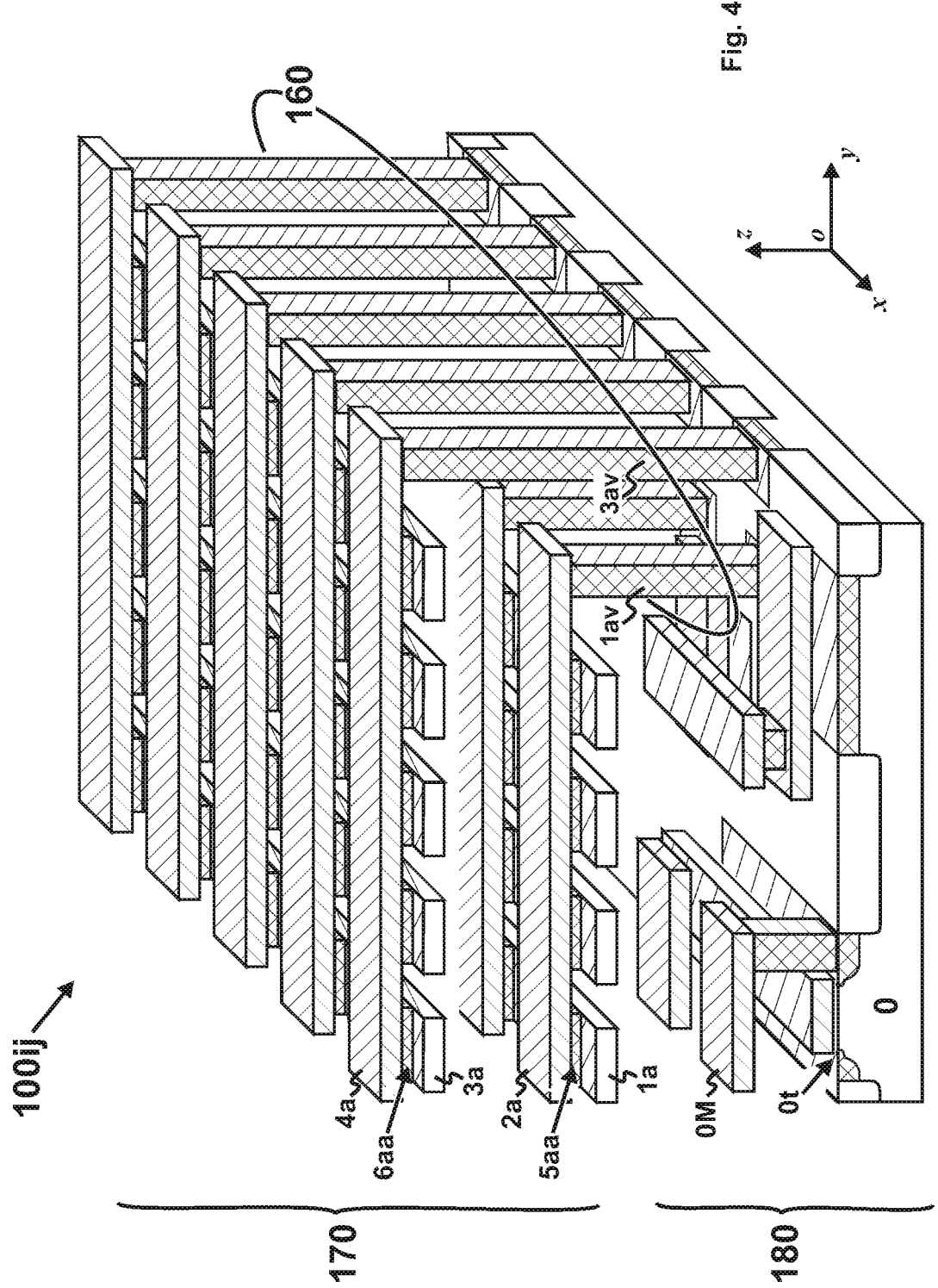
FIG. 4 is a perspective view of a preferred SPU.

Referring now to FIG. 4, a perspective view of the SPU 100$ij$ is shown. The 3D-M array 170 storing the rule/virus patterns is stacked above the pattern-processing circuit 180. The pattern-processing circuit 180 is formed on the substrate 0 and is at least partially covered by the 3D-M array 170. With the 3-D integration, the footprint of the SPU 100$ij$ is the larger one of the 3D-M array 170 and the pattern-processing circuit 180. Accordingly, the preferred SPU 100ij has a smaller size than that using the 2-D integration. In a given die area, the preferred 3-D security processor 200 has more storage capacity and more processing power than prior art. More storage capacity means fewer dice to store the whole rule/virus database and therefore, a lower overall cost; and, more processing power means more pattern-processing circuits on each die and therefore, more parallelism. In addition, the 3-D integration makes the connections (i.e. the contact vias 1av, 3av) between the memory circuits (i.e. the 3D-M arrays 170) and the processing circuits (i.e. the pattern-processing circuits 180) short (on the order of a micron in length, shorter than prior art) and numerous (thousands, more than prior art). As a result, the ISP-connection 160 in the preferred 3-D security processor 200 has a larger bandwidth.

Figure 5A:
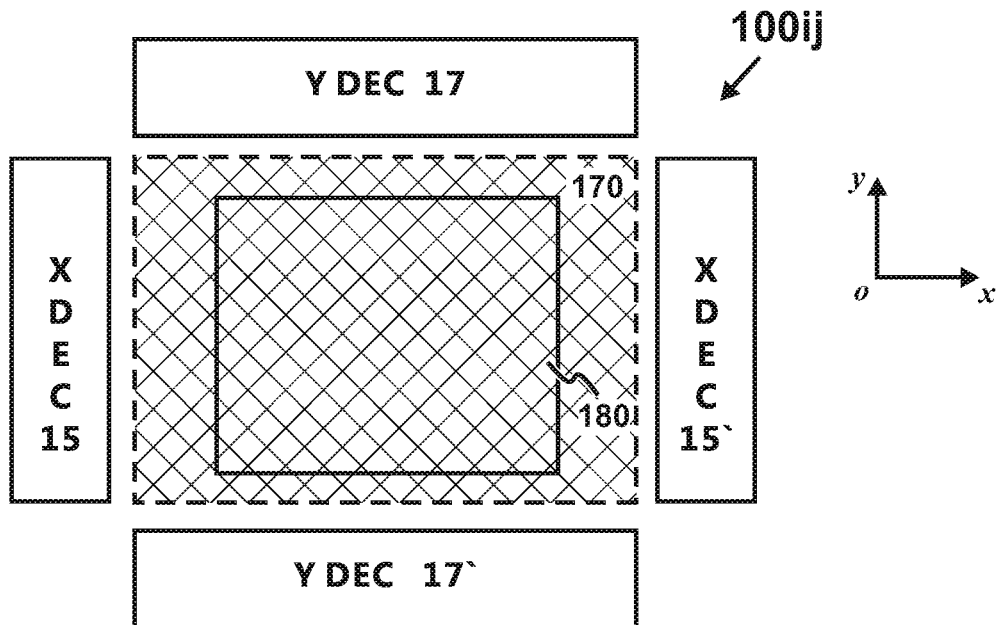
FIGS. 5A-5C are substrate layout views of three preferred SPUs.
Figure 5B:
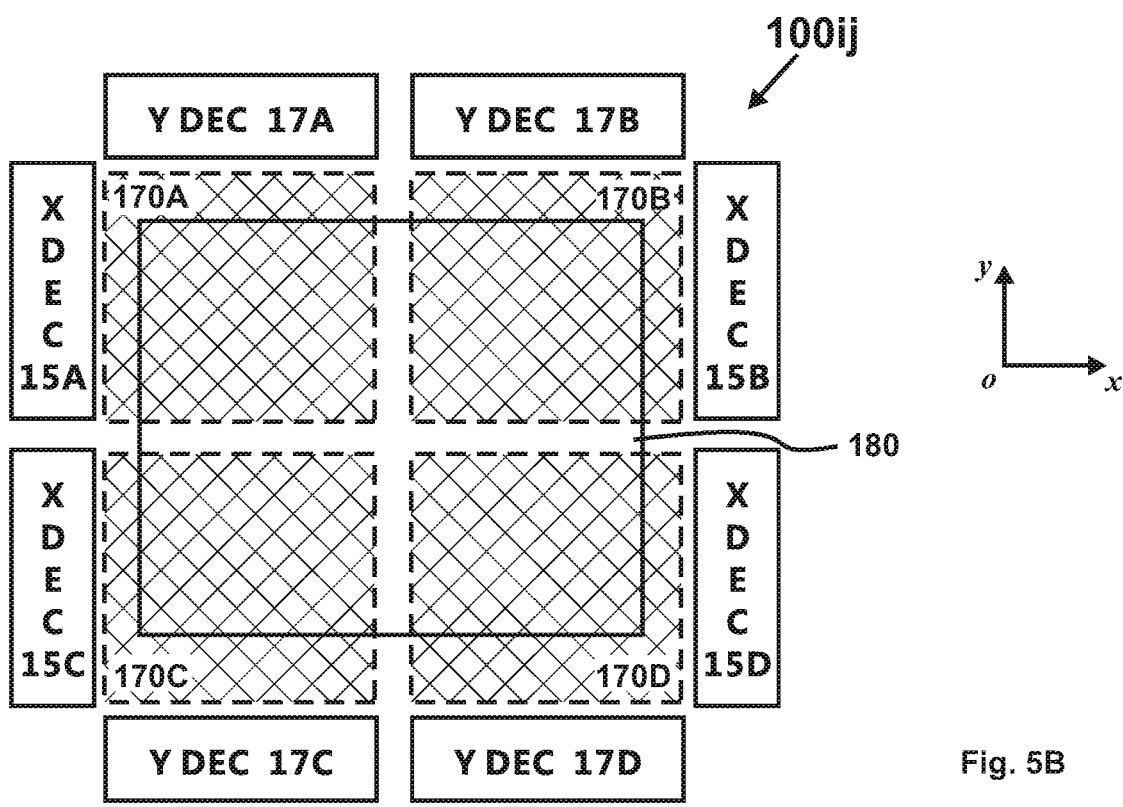
Figure 5C:
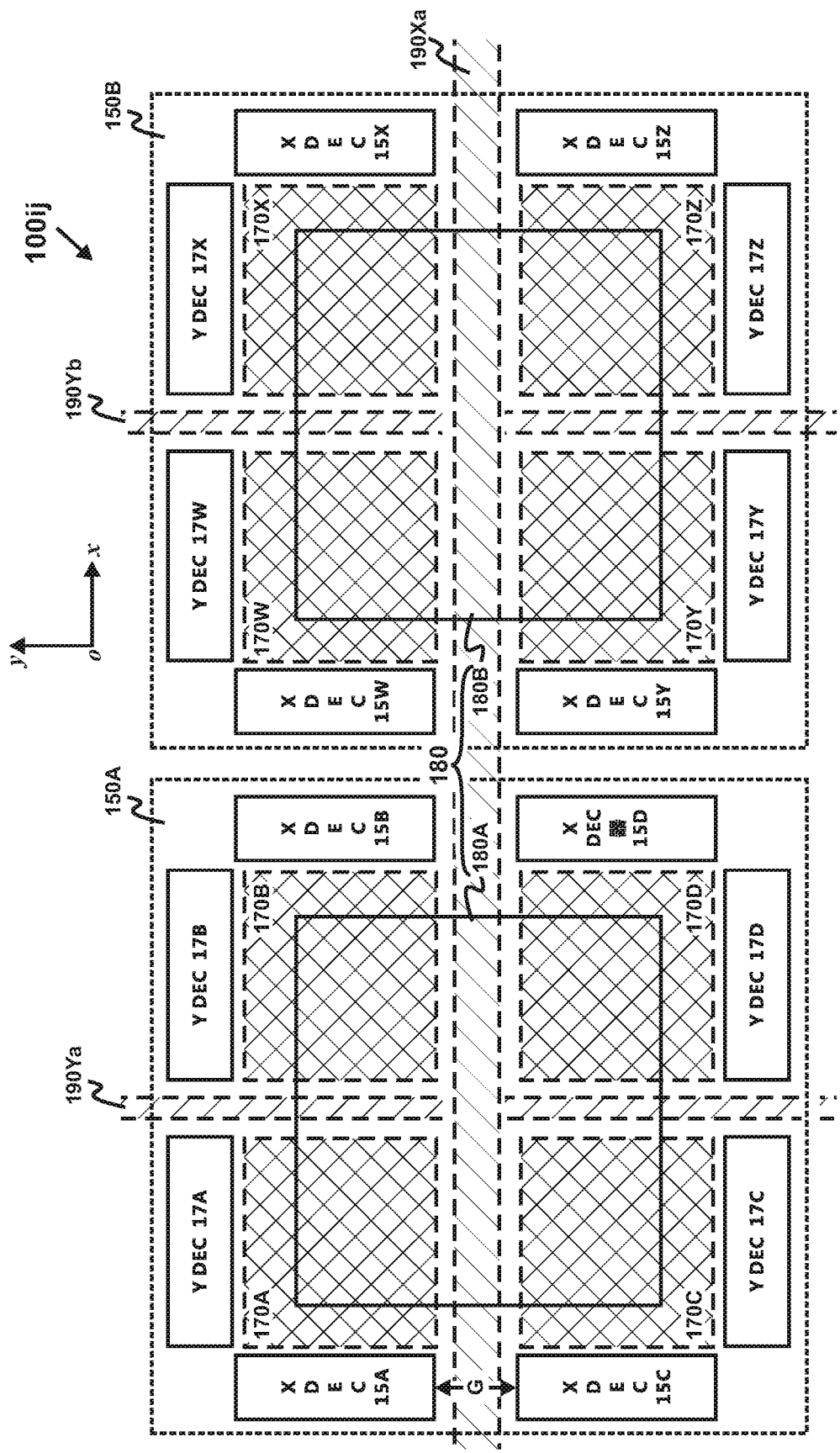

Referring now to FIGS. 5A-5C, the substrate layout views of three preferred SUPs 100ij are shown. The embodiment of FIG. 5A corresponds to the SPU 100iji of FIG. 2A. The pattern-processing circuit 180 works with one 3D-M array 170. It is fully covered by the 3D-M array 170. The 3D-M array 170 has four peripheral circuits, including x-decoders 15, 15' and y-decoders 17, 17'. The pattern-processing circuit 180 is bound by these four peripheral circuits. Because the 3D-M array 170 is stacked above the substrate 0, but not formed on the substrate 0, its projection on the substrate 0, not the 3D-P array itself, is shown in the area enclosed by dash line.

The embodiment of FIG. 5B corresponds to the SPU 100ij of FIG. 2B. The pattern-processing circuit 180 works with four 3D-M arrays 170A-170D. Each 3D-M array (e.g. 170) has two peripheral circuits (e.g. x-decoder 15A and y-decoder 17A). Below these four 3D-M arrays 170A-170D, the pattern-processing circuit 180 is formed. Apparently, the pattern-processing circuit 180 of FIG. 5B could be four times as large as that of FIG. 5A. It can perform more complex pattern-processing functions.

The embodiment of FIG. 5C corresponds to the SPU 100ij of FIG. 2C. The pattern-processing circuit 180 works with eight 3D-M arrays 170A-170D, 170W-170Z. These 3D-M arrays are divided into two sets: a first set 150A includes four 3D-M arrays 170A-170D, and a second set 150B includes four 3D-M arrays 170W-170Z. Below the four 3D-M arrays 170A-170D of the first set 150A, a first component 180A of the pattern-processing circuit 180 is formed. Similarly, below the four 3D-M array 170W-170Z of the second set 150B, a second component 180B of the pattern-processing circuit 180 is formed. In this embodiment, adjacent peripheral circuits (e.g. adjacent x-decoders 15A, 15C, or, adjacent y-decoders 17A, 17B) are separated by physical gaps (e.g. G). These physical gaps allow the formation of the routing channel 190Xa, 190Ya, 190Yb, which provide coupling between different components 180A, 180B, or between different pattern-processing circuits. Apparently, the pattern-processing circuit 180 of FIG. 5C could be eight times as large as that of FIG. 5A. It can perform even more complex pattern-processing functions.

It should be noted that the pattern-processing circuit 180 is formed at the same time as the peripheral circuits of the 3D-M array 170 during the manufacturing process. Although they occupy only a small area on the substrate 0, because the peripheral circuits still need to be formed for the 3D-M anyway, inclusion of the pattern-processing circuit 180 under the 3D-M array 170 is nearly free from the perspective of the 3D-M. This provides great cost advantage for the preferred 3-D security processor.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:

1. A processor for enhancing network security, comprising an input bus for transferring at least a portion of at least a network packet; a semiconductor substrate with transistors thereon; and, at least one thousand storage-processing units (SPU's) disposed on said semiconductor substrate and communicatively coupled with said input bus, each of said SPU's comprising:
    at least a three-dimensional memory (3D-M) array for storing at least a portion of a rule pattern;
    a pattern-processing circuit for performing pattern matching or pattern recognition on said network packet against said rule pattern;
    a plurality of inter-storage-processor (ISP) connections for communicatively coupling said 3D-M array and said pattern-processing circuit;
    wherein said pattern-processing circuit is disposed on said semiconductor substrate; said 3D-M array is stacked above said pattern-processing circuit; and, said processor comprises no more semiconductor substrate other than said semiconductor substrate.

2. The processor according to claim 1, wherein said pattern-processing circuit includes at least a text-matching circuit or a code-matching circuit.

3. The processor according to claim 1, wherein said pattern-processing circuit comprises at least a comparator, a content-addressable-memory (CAM), or a finite-state automata (FSA) circuit.

4. The processor according to claim 1, wherein said 3D-M array is a three-dimensional horizontal memory (3D-$M_H$) array.

5. The processor according to claim 1, wherein said 3D-M array is a three-dimensional vertical memory (3D-$M_V$) array.

6. The processor according to claim 1, wherein said 3D-M array at least partially covers said pattern-processing circuit.

7. The processor according to claim 1, wherein said pattern-processing circuit is covered by at least two 3D-M arrays.

8. A processor for enhancing network security, comprising an input bus for transferring at least a portion of at least a network packet; a semiconductor substrate with transistors thereon; and, a plurality of storage-processing units (SPU's) disposed on said semiconductor substrate and communicatively coupled with said input bus, each of said SPU's comprising:
    at least a three-dimensional memory (3D-M) array for storing at least a portion of a rule pattern;
    a pattern-processing circuit for performing pattern matching or pattern recognition on said network packet against said rule pattern;
    at least one thousand contact vias for communicatively coupling said 3D-M array and said pattern-processing circuit;
    wherein said pattern-processing circuit is disposed on said semiconductor substrate; said 3D-M array is stacked above said pattern-processing circuit; and, said processor comprises no more semiconductor substrate other than said semiconductor substrate.

9. The processor according to claim 8, wherein said pattern-processing circuit includes at least a text-matching circuit, and/or a code-matching circuit.

10. The processor according to claim 8, wherein said pattern-processing circuit comprises at least a comparator, a content-addressable-memory (CAM), or a finite-state automata (FSA) circuit.

11. The processor according to claim 8, wherein said 3D-M array is a three-dimensional horizontal memory (3D-$M_H$) array.

12. The processor according to claim 8, wherein said 3D-M array is a three-dimensional vertical memory (3D-$M_V$) array.

13. The processor according to claim 8, wherein said 3D-M array at least partially covers said pattern-processing circuit.

14. The processor according to claim 8, wherein said pattern-processing circuit is covered by at least two 3D-M arrays.

15. A processor for enhancing network security, comprising an input bus for transferring at least a portion of at least a network packet; a semiconductor substrate with transistors thereon; and, a plurality of storage-processing units (SPU's) disposed on said semiconductor substrate and communicatively coupled with said input bus, each of said SPU's comprising:

at least a three-dimensional memory (3D-M) array for storing at least a portion of a rule pattern;

a pattern-processing circuit for performing pattern matching or pattern recognition on said network packet against said rule pattern;

a plurality of contact vias for communicatively coupling said 3D-M array and said pattern-processing circuit, wherein the length of said contact vias is on the order of a micron;

wherein said pattern-processing circuit is disposed on said semiconductor substrate; said 3D-M array is stacked above said pattern-processing circuit; and, said data storage comprises no more semiconductor substrate other than said semiconductor substrate.

16. The processor according to claim 15, wherein said pattern-processing circuit includes at least a text-matching circuit, and/or a code-matching circuit.

17. The processor according to claim 15, wherein said 3D-M array is a three-dimensional horizontal memory (3D-$M_H$) array.

18. The processor according to claim 15, wherein said 3D-M array is a three-dimensional vertical memory (3D-$M_V$) array.

19. The processor according to claim 15, wherein said 3D-M array at least partially covers said pattern-processing circuit.

20. The processor according to claim 15, wherein said pattern-processing circuit is covered by at least two 3D-M arrays.

* * * * *